US008416740B2

(12) United States Patent
Winstok et al.

(10) Patent No.: US 8,416,740 B2
(45) Date of Patent: Apr. 9, 2013

(54) GROUPING OF USERS ONTO TRAFFIC CHANNELS IN MULTIPLE-USERS-PER-CHANNEL TRANSMISSION SCHEMES

(75) Inventors: Amir Winstok, Tel Aviv (IL); Efrat Isack, Elkana (IL); Tomer Goshen, Kfar Saba (IL); David Ben-Eli, Modiin (IL); Paul S. Spencer, Modiin (IL)

(73) Assignee: Marvell World Trade Ltd., St. Michael (BB)

( * ) Notice: Subject to any disclaimer, the term of this patent is extended or adjusted under 35 U.S.C. 154(b) by 266 days.

(21) Appl. No.: 12/858,446

(22) Filed: Aug. 18, 2010

(65) Prior Publication Data
US 2011/0051650 A1  Mar. 3, 2011

Related U.S. Application Data

(60) Provisional application No. 61/236,821, filed on Aug. 25, 2009.

(51) Int. Cl.
*H04W 4/00* (2009.01)
(52) U.S. Cl.
USPC ............... 370/329; 370/338; 370/341
(58) Field of Classification Search .......... None
See application file for complete search history.

(56) References Cited

U.S. PATENT DOCUMENTS

| 7,230,994 B2 | 6/2007 | Noda |
| 8,275,406 B2 | 9/2012 | Chen |
| 2001/0004355 A1 | 6/2001 | Galyas et al. |
| 2002/0028675 A1 | 3/2002 | Schmutz et al. |
| 2002/0064135 A1 | 5/2002 | Chen et al. |
| 2004/0082333 A1 | 4/2004 | Ito et al. |
| 2006/0072514 A1 | 4/2006 | Kent et al. |
| 2007/0286124 A1* | 12/2007 | Grant et al. .................. 370/331 |
| 2008/0112477 A1* | 5/2008 | Choi et al. .................. 375/227 |
| 2008/0168332 A1* | 7/2008 | Palanki et al. .............. 714/776 |
| 2008/0311918 A1 | 12/2008 | Spencer |
| 2008/0311920 A1 | 12/2008 | Xu et al. |
| 2010/0081445 A1* | 4/2010 | Aghili et al. ................ 455/450 |
| 2010/0165894 A1* | 7/2010 | Furuskar et al. ............ 370/281 |
| 2010/0203854 A1* | 8/2010 | Yu et al. .................... 455/127.1 |
| 2010/0203897 A1* | 8/2010 | Jamadagni et al. .......... 455/450 |
| 2010/0322092 A1* | 12/2010 | Yu ............................... 370/252 |
| 2011/0143766 A1* | 6/2011 | Sun et al. ................... 455/452.2 |

OTHER PUBLICATIONS

3GPP TR45.914, "Technical Specification Group GERAN; Circuit Switched Voice Capacity Evolution for GSM/EDGE Radio Access Network (GERAN); (Release 8)", version 8.1.0, Valbonne, France, May 2009.
Samsung, "Soft-Pairing—Supporting Intra Cell-Inter Channel Measurements for Initial Pairing in MUROS/VAMOS", 3GPP TSG GERAN WG1#42, GP-090627, Shenzhen, China, May 11-15, 2009.

(Continued)

*Primary Examiner* — Chi Pham
*Assistant Examiner* — Soon-Dong D Hyun

(57) ABSTRACT

A method includes transmitting downlink signals to at least first and second mobile communication terminals over respective first and second traffic channels. Reception quality measures are obtained from the first and second mobile communication terminals for at least one of the traffic channels. Based on the reception quality measures, an expected downlink performance is estimated for simultaneous transmission to the first and second mobile communication terminals on a candidate shared traffic channel.

22 Claims, 4 Drawing Sheets

OTHER PUBLICATIONS

3GPP TS45.005, "Technical Specification Group GSM/EDGE, Radio Access Network; Radio transmission and reception (Release 7)", version 7.15.0, Valbonne, France, Aug. 2008.

3GPP TS45.002, "Technical Specification Group GSM/EDGE, Radio Access Network; Multiplexing and multiple access on the radio path (Release 7)", version 7.7.0, Valbonne, France, May 2008.

Marvell, "Higher Order Modulations for MUROS—Concept Description", 3GPP GERAN Teleconference #1 on MUROS, Agenda item 3, Mar. 11, 2008.

3GPP TSG GERAN #30, "Higher Uplink Performance for GERAN Evolution (HUGE)", GP-061478, Lisbon, Portugal, Agenda Item 9, Jun. 26-30, 2006.

Ericsson, "Assessment of HOT performance based on EGPRS performance in live networks", 3GPP TSG GERAN # 32, document GP-062124, Agenda item 7.1.5.5, Sophia Antipolis, France, Nov. 13-17, 2006.

3GPP TSG GERAN #32, "New WID on reduced symbol duration, higher order modulation and turbo coding (RED HOT) for downlink", GP-062488, Agenda Item 6.1, Sophia Antipolis, France, Nov. 13-17, 2006.

Qualcomm Europe, "Speech capacity enhancements using DARP", 3GPP TSG GERAN #36, GP-071738, Vancouver, Canada, Nov. 12-16, 2007.

Nokia Siemens Networks, Nokia Corporation, "Voice Capacity Evolution with Orthogonal Sub Channels", 3GPP TSG GERAN # 36, GP-071792, Agenda Item 6.1, 7.1.5.18, Vancouver, Canada, Nov. 12-16, 2007.

3GPP TSG GERAN #36, "Multi-User Reusing-One-Slot (MUROS)", GP-072033, Agenda Item 6.1, 7.1.518, Vancouver, Canada, Nov. 12-16, 2007.

Telefon AB LM Ericsson, "Adaptive Symbol Constellation for MUROS (Downlink)", 3GPP TSG GERAN # 37, GP-080114, Agenda item 7.1.5.6, Seoul, South Korea, Feb. 18-22, 2008.

Telefon AB LM Ericsson, "Frequency Hopping Schemes for MUROS", 3GPP TSG GERAN #38, GP-080636, Agenda item 7.1.5.6, Malaga, Spain, May 12-16, 2008.

Research in Motion Ltd., "On Training Sequences for MUROS", 3GPP TSG GERAN #39, GP-081053, Agenda item 7.1.5.10, Florence, Italy, Aug. 25-29, 2008.

Spencer et al., U.S. Appl. No. 12/861,834 "Improved VAMOS Transmission Schemes", filed on Aug. 24, 2010.

Ben-Eli et al., U.S. Appl. No. 12/367,630 "Higher-order modulation for increased downlink capacity", filed Feb. 9, 2009.

U.S. Appl. No. 12/367,630 Official Action dated Mar. 7, 2012.

U.S. Appl. No. 12/861,834 Official Action dated Oct. 23, 2012 (16 pages).

U.S. Appl. No. 12/861,834 Official Action dated Jan. 11, 2013 (17 pages).

* cited by examiner

GROUPING OF USERS ONTO TRAFFIC CHANNELS IN MULTIPLE-USERS-PER-CHANNEL TRANSMISSION SCHEMES

CROSS-REFERENCE TO RELATED APPLICATIONS

This application claims the benefit of U.S. Provisional Patent Application 61/236,821, filed Aug. 25, 2009, whose disclosure is incorporated herein by reference.

FIELD OF THE DISCLOSURE

The present disclosure relates generally to communication systems, and particularly to methods and systems for assigning communication channels to users.

BACKGROUND

In some communication networks, signals are transmitted simultaneously to multiple users over the same radio resource. For example, some proposed Global System for Mobile communications (GSM) EDGE Radio Access Network (GERAN) configurations support a feature that is referred to as Multi-User Reusing-One-Slot (MUROS), also known as Voice services over Adaptive Multi-user channels on One Slot (VAMOS). MUROS/VAMOS defines a scheme in which two users are multiplexed in the same time slot.

MUROS is described, for example, by the Third Generation Partnership Project (3GPP) in "Technical Specification Group GERAN; Circuit Switched Voice Capacity Evolution for GSM/EDGE Radio Access Network (GERAN); (Release 8)," TR 45.914, version 8.1.0, May, 2009, which is incorporated herein by reference. Pairing of users onto a common resource in a MUROS/VAMOS system is addressed in "Soft-Pairing—Supporting Intra cell-Inter Channel Measurements for Initial Pairing in MUROS/VAMOS," Technical Document GP-090627, 3GPP TSG GERAN Working Group 1, Shenzhen, China, May 11-15, 2009, which is incorporated herein by reference.

The description above is presented as a general overview of related art in this field and should not be construed as an admission that any of the information it contains constitutes prior art against the present patent application.

SUMMARY

An embodiment that is described herein provides a method that includes transmitting downlink signals to at least first and second mobile communication terminals over respective first and second traffic channels. Reception quality measures are obtained from the first and second mobile communication terminals for at least one of the traffic channels. Based on the reception quality measures, an expected downlink performance is estimated for simultaneous transmission to the first and second mobile communication terminals on a candidate shared traffic channel.

In some embodiments, the method includes initiating the simultaneous transmission to the first and second mobile communication terminals over the candidate shared traffic channel responsively to verifying that the expected downlink performance for the simultaneous transmission meets a predefined performance level. In an embodiment, transmitting the downlink signals includes transmitting the signals using a first modulation scheme that modulates a single bit per symbol, and the simultaneous transmission uses a second modulation scheme that modulates two or more bits per symbol.

In a disclosed embodiment, transmitting the downlink signals includes assigning the first and second traffic channels for the first and second mobile communication terminals at respective first and second different offsets of a given frequency-hopping sequence. In another embodiment, transmitting the downlink signals includes assigning the first and second traffic channels for the first and second mobile communication terminals at respective first and second different time slots within a given offset of a given frequency-hopping sequence.

In some embodiments, the method includes defining the first traffic channel as the candidate shared traffic channel. In an embodiment, obtaining the reception quality metrics includes obtaining from the second mobile communication terminal a reception quality measure that was measured by the second communication terminal on the first traffic channel. In a disclosed embodiment, obtaining the reception quality metrics includes, while the second mobile communication terminal measures the reception quality measure on the first traffic channel, transmitting a dummy signal that carries dummy data on the first traffic channel simultaneously with the downlink signals to the first mobile communication terminal.

In another embodiment, transmitting the downlink signals includes transmitting to the first mobile communication terminal alternately in one of a continuous transmission mode and a discontinuous transmission (DTX) mode, and obtaining the reception quality metrics includes temporarily disabling the DTX mode in transmission to the first mobile communication terminal while the second mobile communication terminal measures the reception quality measure for the first traffic channel. In yet another embodiment, obtaining the reception quality metrics includes inhibiting the second communication terminal from communicating over at least one time slot allocated to the second traffic channel, and causing the second mobile communication terminal to measure the reception quality measure for the first traffic channel during or adjacently to the at least one time slot.

In still another embodiment, transmitting the downlink signals includes transmitting to the second mobile communication terminal on the second traffic channel, and also on the first traffic channel simultaneously with the downlink signals to the first mobile communication terminal, and stopping transmission to the second mobile communication terminal on the second traffic channel upon verifying that the expected downlink performance for the simultaneous transmission meets a predefined performance level. In an embodiment, obtaining the reception quality metrics includes attempting the simultaneous transmission over the first traffic channel during an idle frame of the first mobile communication terminal.

There is additionally provided, in accordance with an embodiment that is described herein, apparatus including a transmission subsystem, a reception subsystem and a processing subsystem. The transmission subsystem is configured to transmit downlink signals to at least first and second mobile communication terminals over respective traffic channels. The reception subsystem is configured to obtain from the first and second mobile communication terminals reception quality measures for at least one of the traffic channels. The processing subsystem is configured to estimate, based on the reception quality measures, an expected downlink performance for simultaneous transmission to the first and second mobile communication terminals on a candidate shared traffic channel.

There is also provided, in accordance with an embodiment that is described herein, a method used in a mobile communication terminal. The method includes receiving downlink signals from a base station over a traffic channel. A reception quality measure for the traffic channel is measured in the mobile communication terminal responsively to the received downlink signals. The reception quality metric is reported from the mobile communication terminal to the base station, so as to enable a processor coupled to the base station to estimate, based on the reception quality measure and on an additional reception quality measure reported by an additional mobile communication terminal, an expected downlink performance for simultaneous transmission to the mobile communication terminal and to the additional mobile communication terminal on a candidate shared traffic channel.

There is additionally provided, in accordance with an embodiment that is described herein, a system including at least first and second mobile communication terminals and one or more base stations. The first and second mobile communication terminals are configured to measure reception quality metrics on respective traffic channels. The base stations are configured to transmit downlink signals to the first and second mobile communication terminals over respective first and second traffic channels, to obtain from the first and second mobile communication terminals the reception quality measures for at least one of the traffic channels, and, based on the obtained reception quality measures, to estimate an expected downlink performance for simultaneous transmission to the first and second mobile communication terminals on a candidate shared traffic channel.

The present disclosure will be more fully understood from the following detailed description of the embodiments thereof, taken together with the drawings in which:

DETAILED DESCRIPTION OF EMBODIMENTS

In some communication systems, a Base Station (BS) supports a mode that transmits signals to two or more Mobile Stations (MSs) over a single shared traffic channel. An example for such a system is the Global System for Mobile communications (GSM) EDGE Radio Access Network (GERAN) network, which supports Multi-User Reusing-One-Slot (MUROS) or Voice services over Adaptive Multi-user channels on One Slot (VAMOS). Examples of shared traffic channels are described further below.

Embodiments that are described herein provide methods and systems for selecting MSs for pairing onto shared traffic channels. In some embodiments, first and second MSs are evaluated for potential pairing over a certain candidate shared traffic channel. In order to assess whether pairing these MSs is feasible, a BS transmits downlink signals to the first and second MSs over respective first and second traffic channels. The BS obtains from the MSs reception quality measures for at least one of the traffic channels. Based on the reception quality measures, the BS estimates an expected downlink performance for simultaneous transmission to the two MSs on the candidate shared traffic channel. If the expected downlink performance is sufficient, the BS initiates simultaneous transmission to the two MSs over the candidate shared traffic channel.

Several example methods for assigning traffic channels to MSs and for estimating the expected performance on candidate shared traffic channels are described below. The methods and systems described herein can be used for performing intra-cell hand-off (i.e., for pairing MSs that are initially associated with the same BS) or inter-cell hand-off (i.e., for pairing MSs that are initially associated with different BSs).

Typically, the methods and systems described herein attempt to pair MSs that are expected to have similar downlink performance on the shared traffic channel. In particular, the disclosed techniques assess the downlink performance of the MSs under similar interference conditions. By measuring the reception performance on actual traffic channels rather than on beacon or control channels, the disclosed techniques are able to predict the expected performance of the MSs on the shared traffic channel with high accuracy and thus to choose sharing configurations that are likely to make the most efficient use of available transmission resources. In some embodiments, the disclosed techniques use reception quality measures that account for interference, such as Carrier-to-Interference (C/I) ratio or Bit Error Probabilities (BEP).

Figure 1:
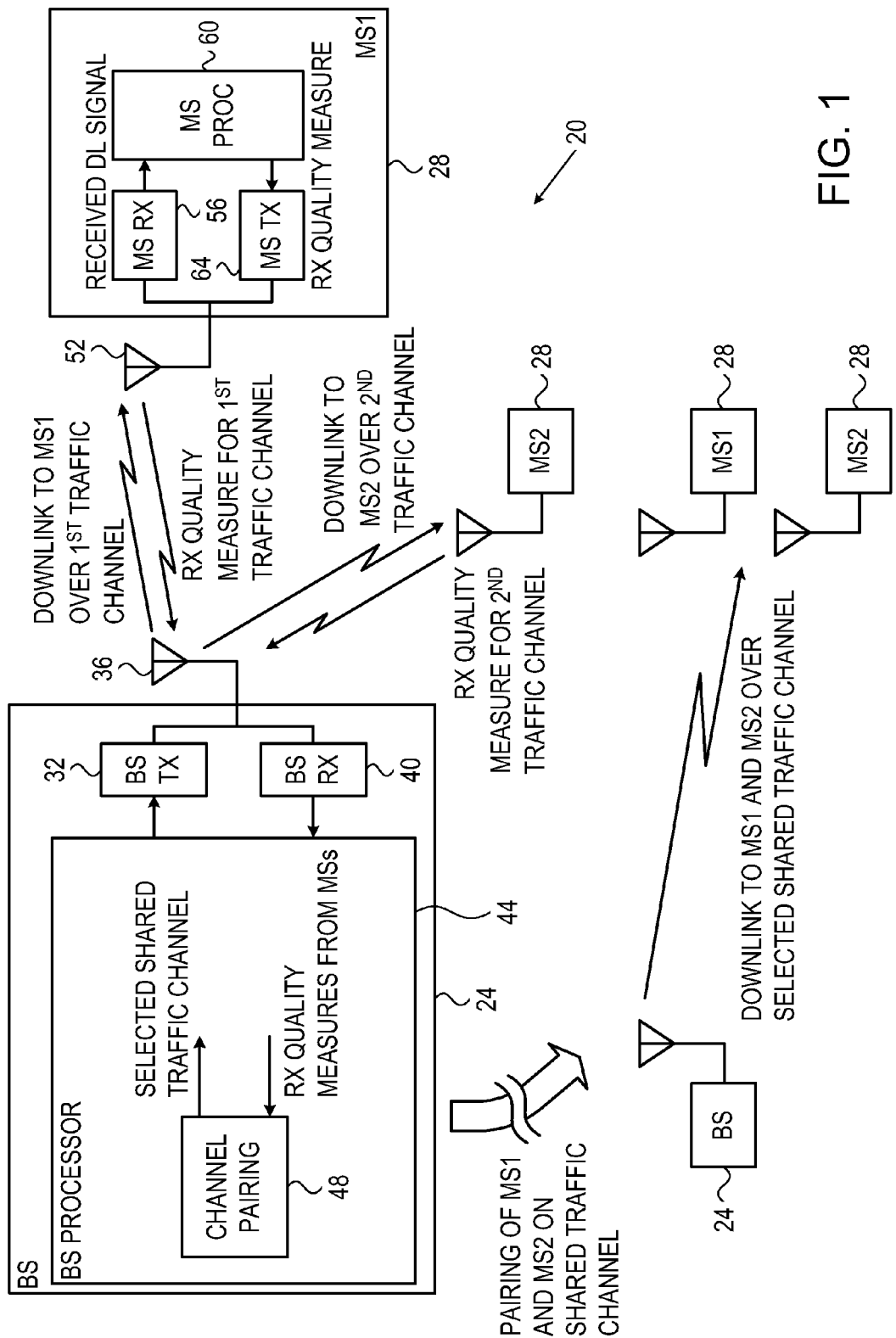
FIG. 1 is a block diagram that schematically illustrates a wireless communication network, in accordance with an embodiment that is described herein.

FIG. 1 is a block diagram that schematically illustrates a wireless communication network 20, in accordance with an embodiment that is described herein. Network 20 comprises a base Station (BS) 24, which communicates with mobile communication terminals 28, also referred to as Mobile Stations (MSs). In the present example, network 20 comprises a GERAN network that supports MUROS or VAMOS. The disclosed techniques, however, are not limited to MUROS/VAMOS, and are applicable to networks that use any other suitable communication protocol.

MSs 28 may comprise, for example, cellular phones, communication-enabled mobile computing devices, cellular adapters for mobile computing devices or any other suitable type of communication terminal. Although FIG. 1 shows a single BS and two MSs for the sake of clarity, real-life networks typically comprise multiple BSs and multiple MSs.

BS 24 transmits downlink signals to each MS 28 over a respective Traffic Channel (TCH). In the example embodiments described herein, BS 24 transmits one or more Radio Frequency (RF) carriers, which in some embodiments hop in frequency. On each carrier, the BS transmits a sequence of frames, each frame comprising eight time slots. Each MS 28 is assigned a given time slot in each frame on a given carrier, and this assignment is regarded as a traffic channel. In alternative embodiments, any other suitable arrangement of traffic channels can also be used.

Traffic channels should be distinguished from other kinds of channels that are transmitted by BS 24. In the context of the present patent application and in the claims, a traffic channel is defined as a channel over which the BS sends user data that is addressed to a specific MS. Channels that are used by MSs for synchronization or control purposes, such as beacon channels and signaling channels, are not regarded as traffic channels.

In some embodiments, BS 24 supports at least two channel assignment modes, each corresponding to a respective modulation scheme. One mode assigns a traffic channel to a single MS. When using this mode, the BS transmits to the single MS over the traffic channel using a modulation scheme that modulates one bit per symbol, such as Gaussian Minimum Shift Keying (GMSK). Another mode assigns a traffic channel to two MSs. When using this mode, the BS transmits to the two MSs over the traffic channel simultaneously, using a modulation scheme that modulates two bits per symbol. Typically, the modulation scheme used in the latter mode comprises a Quadrature modulation scheme, which modulates the traffic for the two MSs on two mutually-orthogonal quadrature sub-channels. The two-bits-per-symbol modulation scheme may comprise, for example, Quadrature Phase Shift Keying (QPSK). In another embodiment, the BS uses a variant of QPSK, in which the two Quadrature sub-channels are given different gains. This variant is sometimes referred to as α-QPSK, wherein α denotes the ratio between the gains of the two quadrature sub-channels.

In some embodiments, BS 24 supports additional modes that transmit to three or more MSs on a single traffic channel using high-order modulation. The disclosed techniques can be adapted to such high-order modes in a straightforward manner. For the sake of clarity, the description that follows refers to two possible modes—one MS per traffic channel and two MSs per traffic channel. For the sake of brevity, these modes are referred to below as a GMSK mode and a VAMOS mode, respectively. A traffic channel on which the BS transmits to a single MS is referred to as a GMSK channel, and a traffic channel on which the BS transmits to two MSs is referred to as a VAMOS channel.

In some embodiments, BS 24 transmits using the GMSK mode to some MSs over some traffic channels, and using the VAMOS mode to other MSs on other traffic channels. The BS selects the mode for transmitting to a given MS based on various criteria. When considering the VAMOS mode, the BS selects pairs of MSs, and attempts to assign each pair a candidate shared VAMOS traffic channel. In particular, the BS estimates, based on the quality measures reported by the MSs, the expected performance of simultaneous transmission (using VAMOS) to a pair of MSs on a candidate shared traffic channel. Example methods for selecting pairs of MSs and for evaluating candidate VAMOS traffic channels are described in detail below.

BS 24 comprises a BS transmitter (BS TX) 32, which transmits the downlink signals via a BS antenna 36 to MSs 28. A BS receiver (BS RX) 40 receives uplink signals from the MSs via antenna 36. The BS further comprises a BS processor 44, which manages and controls the BS operation. In particular, BS processor 44 comprises a channel pairing unit 48, which selects MSs for pairing, and evaluates candidate VAMOS traffic channels for assigning to pairs of MSs, using techniques that are described below.

Consider the two MSs 28 shown in FIG. 1, which are denoted MS1 and MS2. In a typical embodiment, BS 24 initially assigns MS1 and MS2 respective different GMSK traffic channels, and transmits downlink signals to the MSs over the assigned traffic channels. The BS obtains from the MSs reception quality measures for at least one of the traffic channels. (In some embodiments, each MS measures the reception quality on its respective assigned traffic channel. In alternative embodiments, one MS measures the reception quality on the other MS's traffic channel.) Based on the reception quality measures obtained from the MSs, unit 48 in the BS estimates the expected performance of simultaneous transmission (using VAMOS) to the MSs on a candidate shared traffic channel. If the expected performance meets a certain acceptable performance level, the BS typically instructs both MSs to hand-off to the selected VAMOS traffic channel. After this hand-off, the BS transmits to both MS1 and MS2 on the shared VAMOS traffic channel, as shown at the bottom of the figure.

Each MS 28 comprises a MS receiver (MS RX) 56, which receives the downlink signals from the BS via a MS antenna 52. A MS processor 60 calculates a reception quality measure for a given traffic channel. A MS transmitter (MS TX) 64 transmits the reception quality measure to the BS. (The internal MS structure is shown in FIG. 1 only for MS1, for the sake of clarity. MS2 typically has a similar internal structure.)

The system, BS and MS configurations shown in FIG. 1 are simplified example configurations, which are depicted solely for the sake of conceptual clarity. In alternative embodiments, any other suitable system configuration can be used. System, BS and MS elements that are not necessary for understanding the disclosed techniques have been omitted from the figure for the sake of clarity.

The different elements of BS 24 and MS 28, including receiver 32, transmitter 40, processor 44 and unit 48, receiver 56, processor 60 and/or transmitter 64, may be implemented using dedicated hardware, such as using one or more Application-Specific Integrated Circuits (ASICs), Field-Programmable Gate Arrays (FPGAs) or other hardware devices. Alternatively, some BS and/or MS elements may be implemented using software executing on programmable hardware, or using a combination of hardware and software elements. In some embodiments, processor 44 and/or processor 60 comprise programmable processors that are programmed in software to carry out the functions described herein, although they too may be implemented on dedicated hardware. The software may be downloaded to the processors in electronic form, over a network, for example, or it may, alternatively or additionally, be provided and/or stored on non-transitory tangible media, such as magnetic, optical or electronic memory. In some embodiments, some or all of the elements of MS 28 may be fabricated in a chip-set.

The above description refers to a single BS that transmits to MS1 and MS2. The disclosed techniques, however, are not limited to this sort of configuration. In alternative embodiments, One BS transmits to MS1 and another BS transmits to MS2. Upon obtaining reception quality measures from MS1 and MS2, a processor (which may comprise the BS processor of one of the BSs or a different processor) decides whether the two MSs are to be paired, and on which traffic channel. Thus, system 20 can be viewed as comprising a transmission subsystem (comprising the BS transmitters), a reception subsystem (comprising the BS receivers) and a processing subsystem (comprising the BS processors and any other processor that is involved in evaluating and assigning traffic channels). The transmission subsystem transmits downlink signals to the MSs. The MSs calculate reception quality measures based on the received downlink signals and report the measures on the uplink. The reception subsystem receives the reported reception quality measures. The processing subsystem estimates, based on the reported quality measures, the expected performance of simultaneous transmission (using VAMOS) to the MSs on a candidate shared traffic channel.

Figure 2:
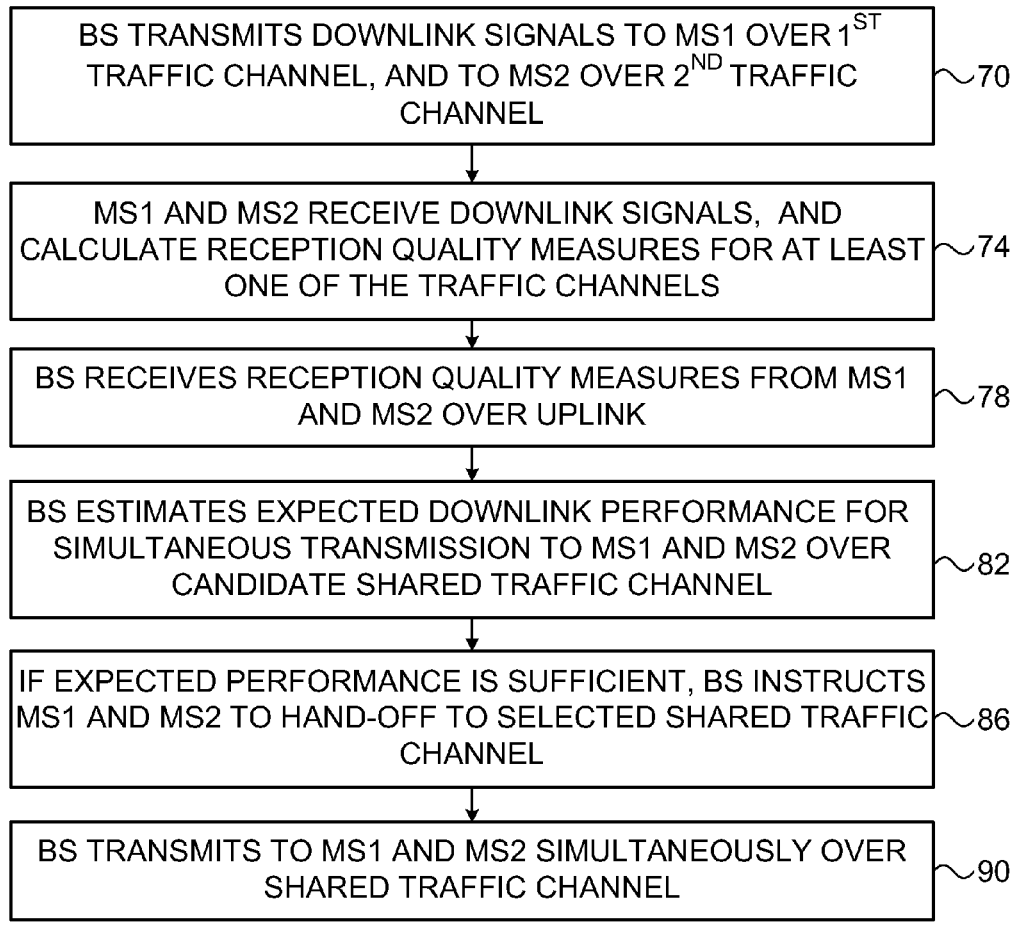
FIG. 2 is a flow chart that schematically illustrates a method for assigning traffic channels to users, in accordance with an embodiment that is described herein.

FIG. 2 is a flow chart that schematically illustrates a method for assigning traffic channels to users, in accordance with an embodiment that is described herein. The method begins at a downlink transmission operation 70, with BS 24 transmitting downlink signals to MS1 and MS2 on respective first and second traffic channels. In the present example, transmission to MS1 and MS2 at this stage is carried out using the GMSK mode. MS1 and MS2 receive the downlink signals and calculate reception quality measures for at least one of the traffic channels, at a quality calculation operation 74. MS1 and MS2 report the calculated reception quality measures to the BS over the uplink. The BS receives the reception quality measures from the MSs, at an uplink reception operation 78.

Based on the reported reception quality measures, the BS evaluates a certain traffic channel as a potential candidate for simultaneous VAMOS transmission to MS1 and MS2. The BS estimates the expected performance of such a simultaneous transmission over the candidate shared traffic channel, at a candidate evaluation operation 82. Typically although not necessarily, the candidate shared channel comprises one of the traffic channels that were initially assigned to MS1 or MS2. In other words, the BS initially assigns a certain traffic channel to one of the MSs in the GMSK mode, and then evaluates whether it is feasible to add the other MS to this traffic channel using VAMOS.

If the expected performance of the simultaneous VAMOS transmission is sufficient, e.g., meets a predefined performance level, the BS instructs the MSs to hand-off to the candidate shared traffic channel, at a hand-off operation 86. The BS then begins to transmit simultaneously to MS1 and MS2, using the VAMOS mode, over the candidate shared traffic channel, at a simultaneous transmission operation 90.

Typically, BS 24 attempts to find MSs that are expected to have similar reception performance when paired on a shared VAMOS traffic channel. The reception performance of a given MS may be affected by various factors, such as distance and line-of-sight from the BS and interference from other signals (e.g., from other BSs). When considering MSs for potential pairing, it is particularly important to measure the reception quality for both MSs under similar interference conditions. Otherwise, the MSs are likely to differ in reception performance on the shared VAMOS traffic channel, even though the reception quality measures predict that they are expected to have similar performance.

In some scenarios, even when two MSs experience similar interference conditions, they may be affected by different sources of interference. For example, the two MSs are often located at different locations, and therefore their distances from potential interference sources (e.g., other BSs) may be different.

Since the disclosed techniques estimate the reception quality over the actual traffic channels rather than over beacon channels, they are able to predict the expected performance of the MSs on the shared VAMOS channel with high accuracy. Interference from other signals (e.g., from other BSs) may differ considerably between a beacon channel and an actual traffic channel. Therefore, reception quality measurement on an actual traffic channel provides a better estimate of the interference conditions than measurements on a beacon channel. In other words, reception quality measurement on the actual traffic channel gives a better prediction of the interference conditions the MS is likely to experience were it to be allocated that traffic channel after pairing. Typically, the disclosed techniques attempt to verify that the MSs meet an acceptable reception performance level (e.g., a frame error rate of 1% for speech), given the expected interference on the traffic channel.

MSs 28 may evaluate any suitable type of reception quality measures on the traffic channel or channels. In an example embodiment, the MSs evaluate Carrier-to-Interference (C/I) ratios. In another embodiment, the MSs evaluate Bit Error Probabilities (BEP). Reception quality measures such as C/I ratio and BEP are sometimes preferable, because they provide a genuine and reliable estimate of the reception quality in the presence of interference, as opposed to Received Signal Strength Indication (RSSI). Nevertheless, RSSI can also be used as a reception quality measure, especially in channels that are noise-limited rather than interference-limited.

In some embodiments, the downlink RF carriers transmitted by BS 24 hop in frequency. In an embodiment, frequency hopping is implemented on a frame-by-frame basis. In other words, the eight time slots of each frame are transmitted on the same frequency, and the BS hops to a different frequency after transmission of each frame according to a predefined hopping sequence. In some embodiments, BS 24 assigns MS1 and MS2 traffic channels on the same frequency-hopping carrier.

Figure 3A:
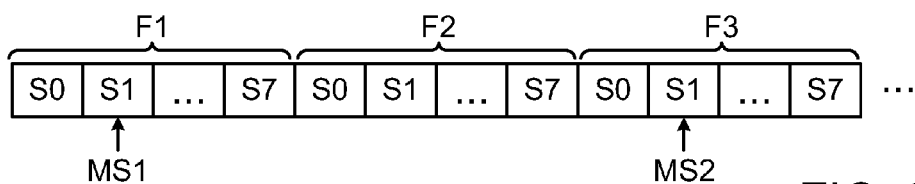
FIGS. 3A and 3B are diagrams that schematically illustrate assignments of traffic channels to users on a single hopping sequence, in accordance with embodiments that are described herein.
Figure 3B:
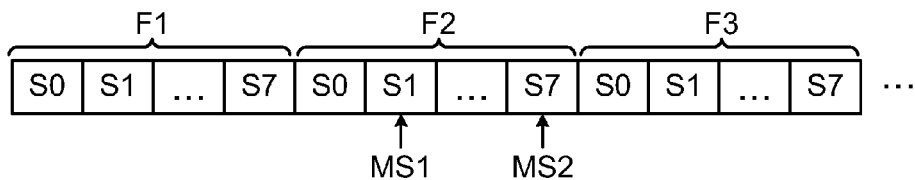

FIGS. 3A and 3B are diagrams that schematically illustrate assignments of traffic channels to users on a single hopping sequence, in accordance with embodiments that are described herein. In these examples, BS 24 transmits a sequence of frames denoted F1, F2, F3, . . . . Each frame comprises eight time slots denoted S0 . . . S7. The BS transmitter hops in frequency between time slot S7 of a given frame and time slot S0 of the next frame. The BS assigns MS1 and MS2 traffic channels on the same frequency hopping sequence.

Assigning the traffic channels for MS1 and MS2 on the same hopping sequence increases the similarity between the interference conditions that are experienced by the two MSs. For example, if the interference is caused by a neighboring BS that also hops in frequency, assigning the MSs traffic channels on different hop sequences would cause large differences between the interference experienced by the two MSs.

In the embodiment of FIG. 3A, the BS assigns MS1 and MS2 traffic channels in different frames (offsets) of the frequency hopping sequence. In some embodiments, the BS assigns MS1 and MS2 traffic channels that occupy the same time slot index but in different frames (offsets). Assigning both traffic channels in the same time slot index makes the interference conditions on the two traffic channels similar, especially when the interference is caused by neighboring BSs that also transmit time-slotted transmissions. In the embodiment of FIG. 3B, the BS assigns MS1 and MS2 traffic channels in different time slots of the same frame (offset) in the frequency hopping sequence.

In some embodiments, the candidate shared VAMOS channel is one of the traffic channels that is initially assigned to one of the MSs. In these embodiments, the BS already transmits to one of the MSs (in the present example to MS1) on the candidate traffic channel, but using the GMSK mode. The BS instructs MS2 to measure the reception quality on the traffic channel of MS1 and report the measurement result. Based on this measurement, the BS can estimate the expected performance of MS2 if MS2 were to be paired with MS1 on the traffic channel of MS1.

Figure 4:
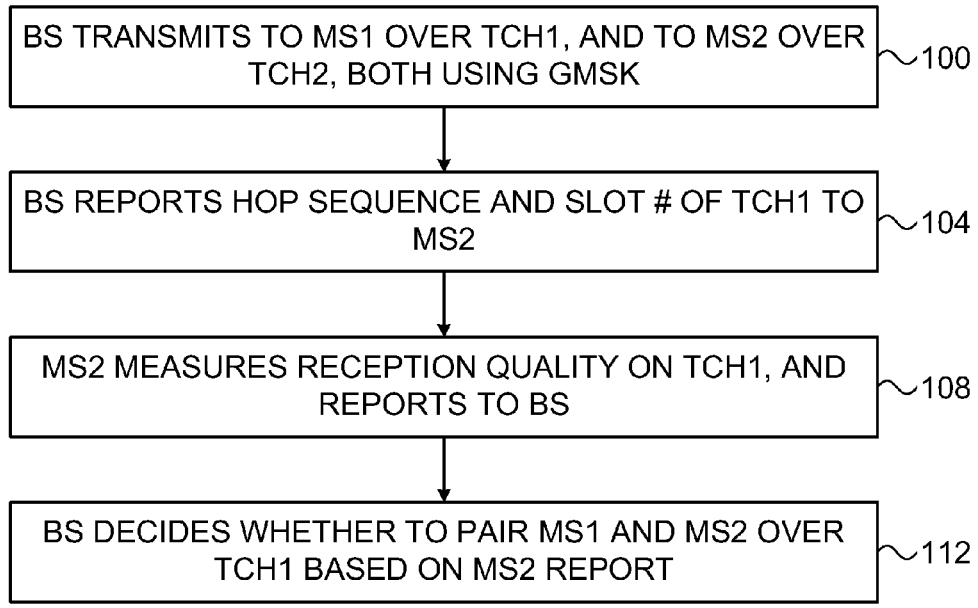
FIGS. 4 and 5 are flow charts that schematically illustrate methods for assigning traffic channels to users, in accordance with alternative embodiments that are described herein.

FIG. 4 is a flow chart that schematically illustrates a method for assigning traffic channels to users, in accordance with an embodiment that is described herein. The method begins at a downlink transmission operation 100, with BS 24 transmitting to MS1 over a traffic channel denoted TCH1 and to MS2 over a traffic channel denoted TCH2. (In the present example both transmissions originate from the same BS. In alternative embodiments, however, MS1 and MS2 receive downlink signals over TCH1 and TCH2, respectively, from different BSs.)

In the present example, the BS considers pairing MS1 and MS2 using the VAMOS mode on TCH1. At a sequence reporting operation 104, the BS reports the hopping sequence and time slot number of TCH1 to MS2, in order to enable MS2 to receive and perform measurements on this traffic channel. In embodiments in which frequency hopping is not used, the BS notifies MS2 of the single frequency on which TCH1 is transmitted. At a TCH1 measurement operation 108, MS2 measures the reception quality on traffic channel TCH1, and reports the measurement result to the BS.

At a decision operation 112, the BS decides whether to pair MS1 and MS2 on traffic channel TCH1, based on the reception quality on TCH1 that was reported by MS2. The reception quality that was reported by MS2 refers to the GMSK mode. In other words, MS2 reported (at operation 108 above) the quality at which it was able to receive the GMSK transmission on TCH1. From this report, the BS estimates the expected reception performance of MS2, if MS2 and MS1 were to both simultaneously receive VAMOS transmissions (e.g., α-QPSK transmissions) over TCH1. If the expected reception performance of both MS1 and MS2 over TCH1 is sufficient, the BS decides to pair MS1 and MS2 over this traffic channel. (Typically, the BS will also verify the expected VAMOS reception performance of MS1 over TCH1 before deciding to pair MS1 and MS2 on this traffic channel. This verification is made using the reception quality measures obtained from MS1.)

In the embodiment of FIG. 4, the BS estimates the expected reception performance of VAMOS signals based on measurements performed on GMSK signals. This sort of estimation involves a certain amount of uncertainty because of the difference in modulation. In alternative embodiments, the BS reduces this uncertainty by transmitting VAMOS modulation over the candidate traffic channel during the measurement period.

Figure 5:
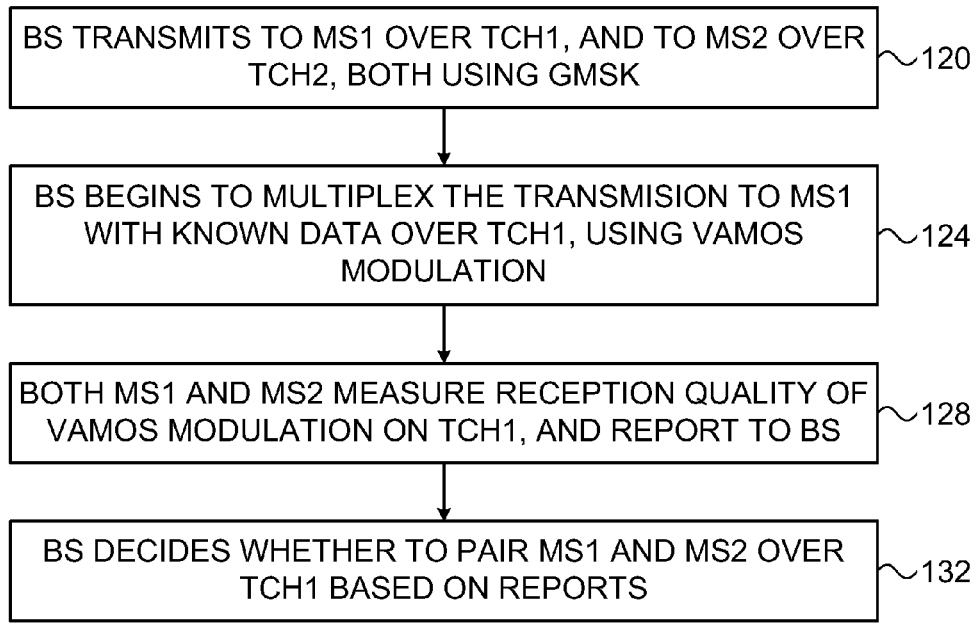

FIG. 5 is a flow chart that schematically illustrates a method for assigning traffic channels to users, in accordance with an embodiment that is described herein. The method begins at a transmission operation 120, with BS 24 transmitting to MS1 over traffic channel TCH1 and to MS2 over traffic channel TCH2. (As noted above, in alternative embodiments MS1 and MS2 receive downlink signals over TCH1 and TCH2 from different BSs.)

Similarly to the example of FIG. 4 above, the BS considers TCH1 as a candidate traffic channel for pairing MS1 and MS2 using VAMOS. In order to decide whether pairing is feasible, the BS instructs MS2 to measure the reception quality on TCH1 and report the measurement result. Unlike the method of FIG. 4, in the present example the BS artificially transmits a VAMOS signal on TCH1 during the period in which MS2 measures the reception quality.

After instructing MS2 to measure the reception quality on TCH1, the BS begins to multiplex the transmission to MS1 with dummy data on TCH1, at a dummy data transmission operation 124. Typically, the BS transmits using the VAMOS mode on TCH1, such that the transmission to MS1 is modulated on one quadrature sub-channel of the VAMOS modulated signal (e.g., α-QPSK), and the dummy data is modulated on the other quadrature sub-channel.

At a VAMOS measurement operation 128, both MS1 and MS2 measure the reception quality on TCH1, and each MS reports its measurement result to the BS. MS1 measures the reception quality on the quadrature sub-channel that carries the downlink transmission designated to MS1. MS2 measures the reception quality on the other quadrature sub-channel, which carries the dummy data. At a BS decision operation 132, the BS decides whether to pair MS1 and MS2 on traffic channel TCH1, based on the reception quality measures reported by MS1 and MS2.

In some embodiments, the dummy data comprises random data that is not known to MS2, and MS2 estimates a statistical reception quality measure such as Bit Error Rate (BER). In alternative embodiments, the dummy data comprises a pseudo-random sequence that is known to MS2. In this embodiment, MS2 is able to measure the reception quality with high accuracy. In an embodiment, the pseudo-random sequence is synchronized to the frame format of the BS transmission, such that MS2 is able to synchronize to the phase of the sequence at any given time. In an example embodiment, the pseudo-random sequence may be aligned to start, for example, with a certain multi-frame or super-frame number.

In some embodiments, the BS selects whether to transmit on a given traffic channel in a continuous transmission mode or in a discontinuous transmission (DTX) mode. DTX transmission reduces the interference caused to other BSs and/or MSs. In the DTX mode, the BS transmits in the time slots of the traffic channel only if there is active speech to be transmitted. In GERAN systems, for example, only twelve frames out of every 104 frames would contain transmitted time slots if the BS has no active speech to transmit. In the continuous transmission mode, the BS transmits every time slot regardless of speech activity.

Consider a scenario in which the BS considers pairing MS1 and MS2 on a certain traffic channel that is currently assigned only to MS1. As described above, the BS instructs MS2 to measure the reception quality on the traffic channel of MS1 in order to assess whether pairing is feasible. If the BS were to transmit to MS1 using DTX while MS2 attempts to measure the reception quality, the measurement of MS2 would be likely to be distorted. Thus, in some embodiments the BS temporarily disables the DTX mode on the traffic channel of MS1 during the time period in which MS2 measures the reception quality on this traffic channel. During this time period, the BS transmits to MS1 using the continuous transmission mode. Transmission using the continuous transmission mode also allows fast collection of reception quality measurements by MS1 and/or MS2.

In some of the disclosed methods, a certain MS is instructed to measure the reception quality on the traffic channel of another MS in order to assess the feasibility of pairing the two MSs on a shared VAMOS traffic channel. In some cases, the MS is requested to perform this measurement task concurrently with its normal operation, i.e., while it continues to communicate over its own designated uplink and downlink traffic channels. In some embodiments, the MS temporarily inhibits communication on one or more of its designated reception or transmission time slots, in order to tune-in and measure the reception quality on the other MS's traffic channel. This technique is particularly useful when switching to the other MS's traffic channel involves a change in frequency, such as in frequency-hopping or inter-BTS hand-off scenarios.

Figure 6A:
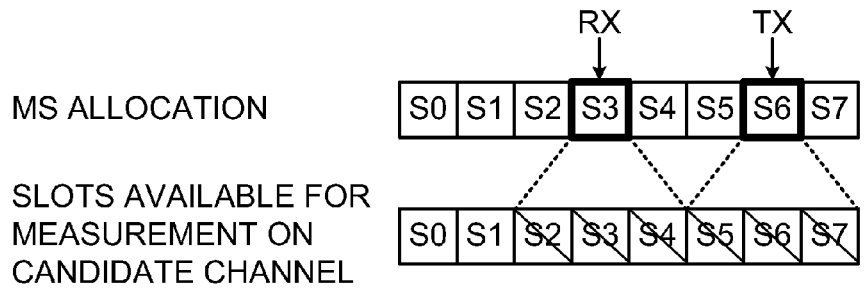
FIGS. 6A-6C are diagrams that schematically illustrate selective disabling of time slots, in accordance with embodiments that are described herein.
Figure 6B:
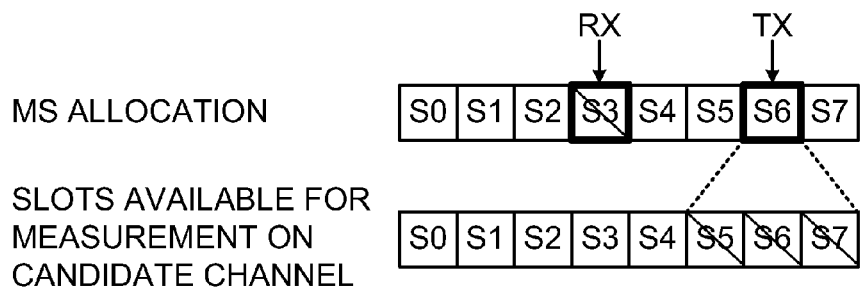
Figure 6C:
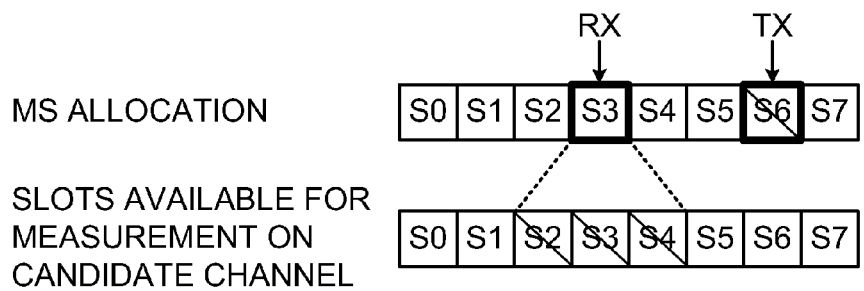

FIGS. 6A-6C are diagrams that schematically illustrate selective disabling of time slots, in accordance with embodiments that are described herein. In the example of FIG. 6A, a MS is allocated time slot S3 in every frame for reception and time slot S6 in every frame for transmission. The bottom of FIG. 6A shows the time slots (traffic channels) that this MS is able to receive (and measure reception quality), assuming it actually communicates during time slots S3 and S6 of every frame. As can be seen in the figure, the MS is unable to receive time slots S2 . . . S4 because they overlap or neighbor time slot S3. Similarly, the MS is unable to receive time slots S5 . . . S7 because they overlap or neighbor time slot S6.

In this example, the assumption is that the MS is unable to receive time slots that are adjacent to time slots S3 and S6, as well. This assumption holds in most practical cases, since switching to a different time slot often involves a change in frequency. (In addition, the timing of the TX time slots may deviate from the timing of the RX time slots due to time advance, e.g., by up to ⅓ of a time slot. This effect is not shown in the figures for the sake of clarity.) Thus, if the MS actually communicates during time slots S3 and S6 of every frame, it is able to measure the reception quality on another downlink traffic channel only if that traffic channel occupies time slot S0 or S1. This constraint may considerably limit the choice of MSs for pairing.

FIG. 6B shows an embodiment in which the MS temporarily inhibits reception on time slot S3 in a given frame. Time slot S6 is still used for transmission. Inhibiting reception on time slot S3 enables the MS to receive traffic channels of other MSs that overlap or are adjacent to time slot S3, i.e., time slots S2 . . . S4. In summary, in this example the MS is able to tune-in to other traffic channels that occupy time slots S0 . . . S4, thus doubling the number of accessible traffic channels.

FIG. 6C shows another embodiment, in which the MS temporarily inhibits transmission on time slot S6 in a given frame. Time slot S3 is still used for transmission. Inhibiting transmission on time slot S6 enables the MS to receive traffic channels of other MSs that overlap or are adjacent to time slot S6, i.e., time slots S5 . . . S7. In this example, the MS is able to tune-in to other traffic channels that occupy time slots S0 . . . S1 and S5-S7.

In alternative embodiments, the MS may inhibit both transmission and reception on a given frame, thus enabling it to receive any desired traffic channel on any desired time slot. In some embodiments, the number of inhibited TX or RX time slots can be limited to one time slot per speech frame, or to any other suitable number. The limitation may be enforced by the BS or by the MS. In an example embodiment, when the BS instructs the MS to measure the reception quality on another MS's traffic channel, the BS also instructs the MS to inhibit communication on the appropriate TX or RX time slot for performing the measurement.

In an alternative embodiment, the BS communicates with the MS in question using the DTX mode, and schedules the measurements on the other MS's traffic channel to time intervals where the TX or RX time slots of the measuring MS are unoccupied due to lack of speech activity. In an embodiment, the MS is requested to report the measurement results to the BS within a specified time period. If no speech-inactivity intervals occur during this time period, the MS reverts to inhibit active RX or TX time slots.

In some embodiments, the BS and MS use variable-rate speech coding, such as Adaptive Multi-Rate (AMR) coding, on the uplink and/or downlink traffic channel. In an example embodiment, the BS and MS switch to lower-rate speech encoding when inhibiting a certain TX or RX time slot. Encoding the speech at a lower rate provides higher resilience to errors that may be caused by the inhibited time slot.

In some of the methods described herein, the BS assesses the feasibility of pairing a pair of MSs on a certain shared VAMOS traffic channel. If pairing is feasible, the BS instructs one or both MSs to hand-off to the shared VAMOS traffic channel. In some embodiments, the candidate channel is one of the traffic channels that is already assigned to one of the MSs, in which case the BS instructs the other MS to hand-off to that traffic channel.

In some embodiments, the BS carries out a reliable hand-off process that (1) instructs a given MS to hand-off from its initial GMSK traffic channel to a shared VAMOS traffic channel, (2) transmits to the MS both on the initial GMSK traffic channel and on the shared VAMOS traffic channel, and (3) stops transmitting on the initial GMSK traffic channel only after the hand-off process is completed successfully.

Figure 7:
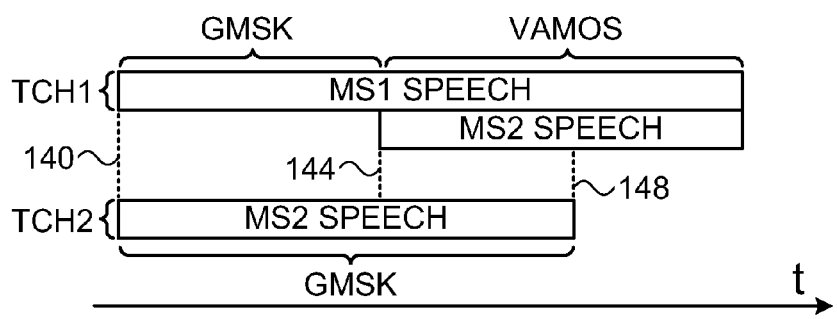
FIG. 7 is a diagram that schematically illustrates a hand-off process to a shared traffic channel, in accordance with an embodiment that is described herein.

FIG. 7 is a diagram that schematically illustrates a hand-off process to a shared VAMOS traffic channel, in accordance with an embodiment that is described herein. At an initial time 140, the BS transmits to MS1 on traffic channel TCH1, and to MS2 on traffic channel TCH2, both using GMSK. (The description below refers to a single BS. In alternative embodiments, one BS transmits to MS1 and another BS transmits to MS2. In these embodiments, the hand-off process is performed between the two BSs.) At a later time 144, the BS decides to pair MS1 and MS2 on traffic channel TCH1 using VAMOS. The BS thus instructs MS2 to hand-off from traffic channel TCH2 to traffic channel TCH1. After instructing MS2 to hand-off, the BS begins transmitting to MS2 simultaneously on both TCH1 and on TCH2. The transmission to MS2 on traffic channel TCH2 is performed, as before, using GMSK. The transmission to MS2 on traffic channel TCH1 is performed using VAMOS, together with the transmission to MS1.

Assuming that MS2 receives the BS transmission on the shared VAMOS traffic channel (TCH1) at a sufficient quality, MS2 sends a hand-off confirmation message to the BS at a time 148. The hand-off confirmation message indicates that the hand-off process completed successfully. In response to this message, the BS stops transmitting to MS2 over traffic channel TCH2. From this point, transmission to both MS1 and MS2 is performed using VAMOS on traffic channel TCH1. If MS2 does not receive the BS transmissions properly over the shared VAMOS traffic channel, MS2 is still able to receive the BS transmissions without interruption on TCH2. In this case, MS2 typically sends a message to the BS indicating that the hand-off attempt has failed.

In some embodiments, the BS transmits an idle frame once every N frames. The idle frame does not contain actual speech or other data, and is typically used for performing measurements by the MSs. In GERAN systems, for example, the BS inserts an idle frame once every twenty-six frames. In some embodiments, the BS assesses the feasibility of pairing MS1 and MS2 on a candidate shared VAMOS channel by (1) transmitting a VAMOS signal on a given time slot during the idle frame, and (2) instructing MS1 and MS2 to measure the reception quality on this VAMOS channel and report the measurement results.

Using this technique, the VAMOS transmission does not affect the transmission of speech or other data to MS1 and MS2, since the VAMOS transmission is carried out during the idle frame. For example, the BS is able to transmit an α-QPSK VAMOS signal using a power ratio (α) that potentially has poor performance, without risk of dropping a call or degrading the call performance of MS1 or MS2. This technique is particularly useful when both MS1 and MS2 communicate with the same BS, because the timing of idle frames is generally not synchronized between different BSs.

It is thus noted that the embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art.

The invention claimed is:

1. A method, comprising:
   transmitting downlink signals to at least first and second mobile communication terminals over respective first and second traffic channels;
   obtaining from the first and second mobile communication terminals reception quality measures for one or both of the first and second traffic channels, including at least a reception quality measure that was measured by the second communication terminal on the first traffic channel; and
   based on the reception quality measures, estimating an expected downlink performance for simultaneous transmission to the first and second mobile communication terminals on the first traffic channel.

2. The method according to claim 1, comprising, responsively to verifying that the expected downlink performance for the simultaneous transmission meets a predefined performance level, initiating the simultaneous transmission to the first and second mobile communication terminals over the first traffic channel.

3. The method according to claim 1, wherein transmitting the downlink signals comprises transmitting the signals using a first modulation scheme that modulates a single bit per symbol, and wherein the simultaneous transmission uses a second modulation scheme that modulates two or more bits per symbol.

4. The method according to claim 1, wherein transmitting the downlink signals comprises assigning the first and second traffic channels for the first and second mobile communication terminals at respective first and second different offsets of a given frequency-hopping sequence.

5. The method according to claim 1, wherein transmitting the downlink signals comprises assigning the first and second traffic channels for the first and second mobile communication terminals at respective first and second different time slots within a given offset of a given frequency-hopping sequence.

6. The method according to claim 1, wherein obtaining the reception quality metrics comprises, while the second mobile communication terminal measures the reception quality measure on the first traffic channel, transmitting a dummy signal that carries dummy data on the first traffic channel simultaneously with the downlink signals to the first mobile communication terminal.

7. The method according to claim 1, wherein transmitting the downlink signals comprises transmitting to the first mobile communication terminal alternately in one of a continuous transmission mode and a discontinuous transmission (DTX) mode, and wherein obtaining the reception quality metrics comprises temporarily disabling the DTX mode in transmission to the first mobile communication terminal while the second mobile communication terminal measures the reception quality measure for the first traffic channel.

8. The method according to claim 1, wherein obtaining the reception quality metrics comprises inhibiting the second communication terminal from communicating over at least one time slot allocated to the second traffic channel, and causing the second mobile communication terminal to measure the reception quality measure for the first traffic channel during or adjacently to the at least one time slot.

9. The method according to claim 1, wherein transmitting the downlink signals comprises transmitting to the second mobile communication terminal on the second traffic channel, and also on the first traffic channel simultaneously with the downlink signals to the first mobile communication terminal, and stopping transmission to the second mobile communication terminal on the second traffic channel upon verifying that the expected downlink performance for the simultaneous transmission meets a predefined performance level.

10. The method according to claim 1, wherein obtaining the reception quality metrics comprises attempting the simultaneous transmission over the first traffic channel during an idle frame of the first mobile communication terminal.

11. Apparatus, comprising:
    a transmission subsystem, which is configured to transmit downlink signals to at least first and second mobile communication terminals over respective traffic channels;
    a reception subsystem, which is configured to obtain from the first and second mobile communication terminals reception quality measures for one or both of the first and second traffic channels, including at least a reception quality measure that was measured by the second communication terminal on the first traffic channel; and
    a processing subsystem, which is configured to estimate, based on the reception quality measures, an expected downlink performance for simultaneous transmission to the first and second mobile communication terminals on a the first traffic channel.

12. The apparatus according to claim 11, wherein the transmission subsystem is configured to initiate the simultaneous transmission to the first and second mobile communication terminals over the first traffic channel responsively to verification by the processing system that the expected downlink performance for the simultaneous transmission meets a predefined performance level.

13. The apparatus according to claim 11, wherein the transmission subsystem is configured to transmit the signals using a first modulation scheme that modulates a single bit per symbol, and wherein the simultaneous transmission uses a second modulation scheme that modulates two or more bits per symbol.

14. The apparatus according to claim 11, wherein the transmission subsystem is configured to assign the first and second traffic channels for the first and second mobile communication terminals at respective first and second different offsets of a given frequency-hopping sequence.

15. The apparatus according to claim 11, wherein the transmission subsystem is configured to assign the first and second traffic channels for the first and second mobile communication terminals at respective first and second different time slots within a given offset of a given frequency-hopping sequence.

16. The apparatus according to claim 11, wherein the transmission subsystem is configured to transmit, while the second mobile communication terminal measures the reception quality measure on the first traffic channel, a dummy signal that carries dummy data on the first traffic channel simultaneously with the downlink signals to the first mobile communication terminal.

17. The apparatus according to claim 11, wherein the transmission subsystem is configured to transmit to the first mobile communication terminal alternately in one of a continuous transmission mode and a discontinuous transmission (DTX) mode, and to temporarily disable the DTX mode in transmission to the first mobile communication terminal while the second mobile communication terminal measures the reception quality measure for the first traffic channel.

18. The apparatus according to claim 11, wherein at least one of the transmission subsystem and the reception subsystem is configured to inhibit the second communication terminal from communicating over at least one time slot allocated to the second traffic channel, and to cause the second mobile communication terminal to measure the reception quality measure for the first traffic channel during or adjacently to the at least one time slot.

19. The apparatus according to claim 11, wherein the transmission subsystem is configured to transmit to the second mobile communication terminal on the second traffic channel, and also on the first traffic channel simultaneously with the downlink signals to the first mobile communication terminal, and to stop transmission to the second mobile communication terminal on the second traffic channel upon verification by the processing subsystem that the expected downlink performance for the simultaneous transmission meets a predefined performance level.

20. The apparatus according to claim 11, wherein the transmission subsystem is configured to attempt the simultaneous transmission over the first traffic channel during an idle frame of the first mobile communication terminal.

21. A method, comprising:
in a mobile communication terminal, receiving downlink signals from a base station over a first traffic channel;
measuring in the mobile communication terminal a reception quality measure for the first traffic channel responsively to the received downlink signals; and
reporting the reception quality metric from the mobile communication terminal to the base station, so as to enable a processor coupled to the base station to estimate, based on the reception quality measure and on an additional reception quality measure measured on the first traffic channel by an additional mobile communication terminal, an expected downlink performance for simultaneous transmission to the mobile communication terminal and to the additional mobile communication terminal on the first traffic channel.

22. A system, comprising:
at least first and second mobile communication terminals, which are configured to measure reception quality metrics on respective first and second traffic channels; and
one or more base stations, which are configured to transmit downlink signals to the first and second mobile communication terminals over the respective first and second traffic channels, to obtain from the first and second mobile communication terminals the reception quality measures for one or both of the first and second traffic channels, including at least a reception quality measure that was measured by the second communication terminal on the first traffic channel, and, based on the obtained reception quality measures, to estimate an expected downlink performance for simultaneous transmission to the first and second mobile communication terminals on the first traffic channel.

* * * * *